(12) United States Patent
Tahara

(10) Patent No.: US 7,499,388 B2
(45) Date of Patent: Mar. 3, 2009

(54) OPTICAL DISC DEVICE OPTICAL HEAD AND PHOTO-DETECTION DEVICE THEREOF

(75) Inventor: Katsutoshi Tahara, Tokyo (JP)

(73) Assignee: Sony Corporation, Tokyo (JP)

( * ) Notice: Subject to any disclaimer, the term of this patent is extended or adjusted under 35 U.S.C. 154(b) by 480 days.

(21) Appl. No.: 10/554,268

(22) PCT Filed: Mar. 1, 2005

(86) PCT No.: PCT/JP2005/003379

§ 371 (c)(1),
(2), (4) Date: Oct. 25, 2005

(87) PCT Pub. No.: WO2005/086147

PCT Pub. Date: Sep. 15, 2005

(65) Prior Publication Data

US 2006/0262680 A1  Nov. 23, 2006

(30) Foreign Application Priority Data

Mar. 4, 2004  (JP) ............................. 2004-061421

(51) Int. Cl.
*G11B 7/13* (2006.01)

(52) U.S. Cl. ................................. 369/124.12

(58) Field of Classification Search ............. 369/124.12
See application file for complete search history.

(56) References Cited

U.S. PATENT DOCUMENTS

| | | | | | |
|---|---|---|---|---|---|
| 4,750,162 A | * | 6/1988 | Tajima | ...................... | 369/44.26 |
| 5,291,466 A | * | 3/1994 | Kwak | ...................... | 369/44.35 |
| 5,563,858 A | * | 10/1996 | Fuji | ......................... | 369/44.28 |
| 5,926,445 A | * | 7/1999 | Sasaki et al. | .............. | 369/44.25 |
| 6,078,552 A | * | 6/2000 | Yamamoto et al. | ........ | 369/47.51 |
| 6,157,606 A | * | 12/2000 | Inazawa et al. | .............. | 369/116 |
| 6,246,660 B1 | * | 6/2001 | Yanagawa | .................... | 369/116 |
| 6,545,972 B1 | * | 4/2003 | Kato et al. | .............. | 369/124.12 |
| 6,567,372 B2 | * | 5/2003 | Takamine et al. | ......... | 369/275.4 |
| 7,023,767 B2 | * | 4/2006 | Wu et al. | .................. | 369/44.29 |

FOREIGN PATENT DOCUMENTS

| | | |
|---|---|---|
| JP | 5-151600 | 6/1993 |
| JP | 9-69234 | 3/1997 |
| JP | 9-180213 | 7/1997 |
| JP | 9-259451 | 10/1997 |
| JP | 2000-298853 | 10/2000 |
| JP | 2000-306253 | 11/2000 |
| JP | 2001-266371 | 9/2001 |
| JP | 2002-288855 | 10/2002 |

OTHER PUBLICATIONS

English translation of JP 2000-306253 provided by the JPO website.*
English translation of JP 2001-266371 provided by the JPO website.*

* cited by examiner

*Primary Examiner*—Michael V Battaglia
(74) *Attorney, Agent, or Firm*—Oblon, Spivak, McClelland, Maier & Neustadt, P.C.

(57) ABSTRACT

A photodetector IC in an optical head device includes a four-segment photodetector (30) and a push-pull signal generator (33). The push-pull signal generator (33) generates a sum signal (A+D) of radially outer photodetector segments and a sum signal (B+C) of radially inner photodetector segments. The sum signal (B+C) is multiplied with a coefficient t entered from outside and a signal ((A+D)−t×(B+C)) is generated by a subtractor. The signal generated is output as a radial push-pull signal (R-PP). The coefficient t is a value corresponding to the ratio of the light volume of the outer rim side photodetector segments and the light volume of the inner rim side photodetector segments.

8 Claims, 15 Drawing Sheets

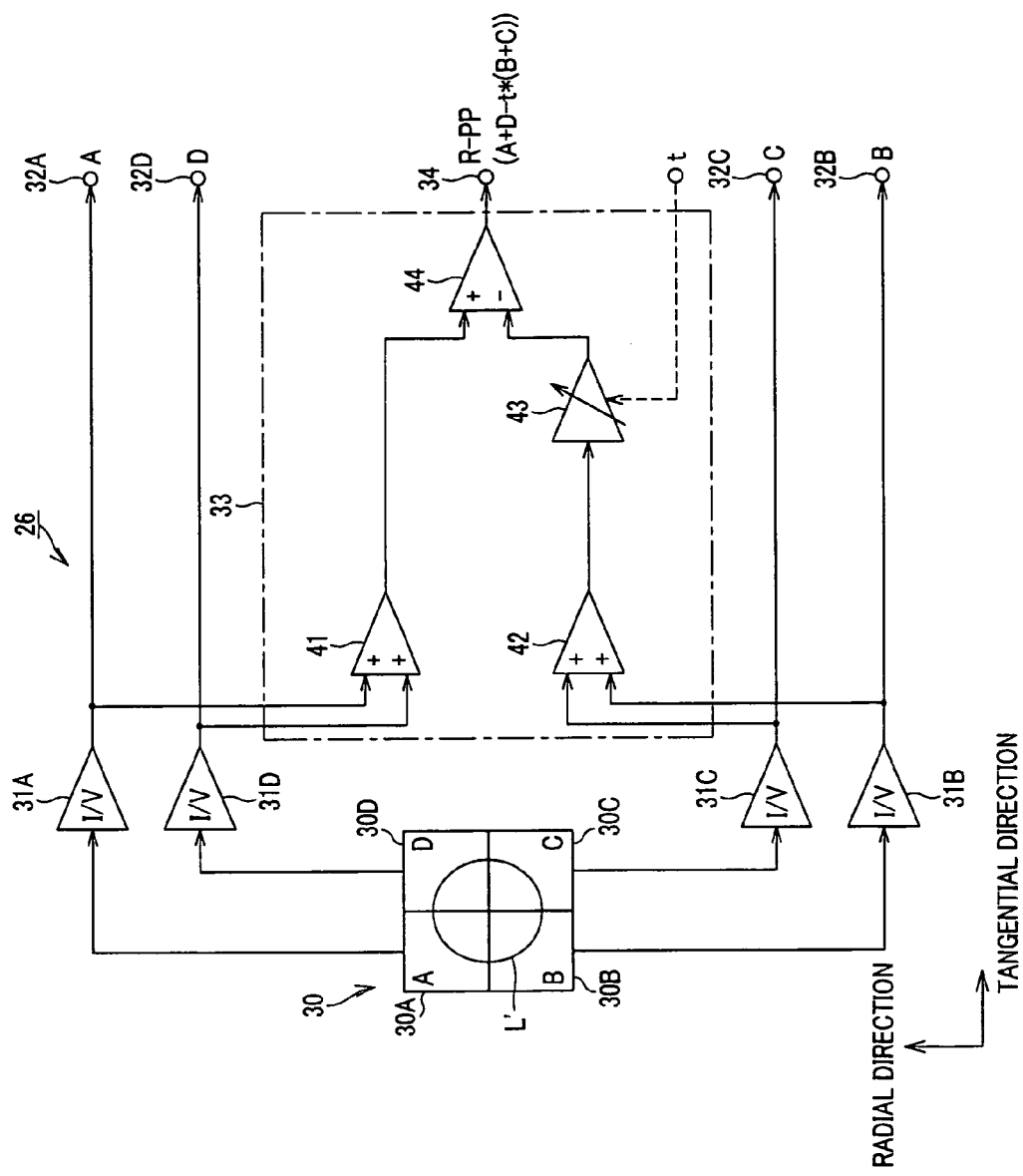
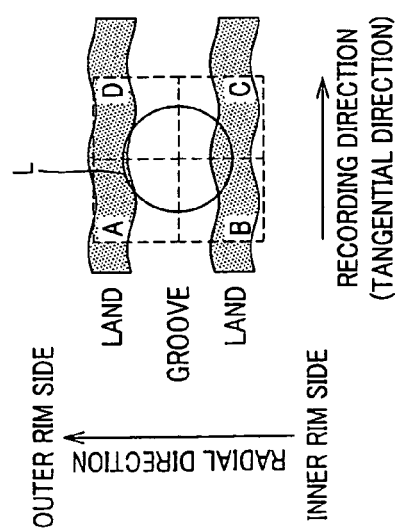
FIG.9A
FIG.9B

OPTICAL DISC DEVICE OPTICAL HEAD AND PHOTO-DETECTION DEVICE THEREOF

TECHNICAL FIELD

This invention relates to a light detecting unit used in an optical head device (optical pickup) for recording and/or reproducing an optical disc.

The present invention contains subject matter related to Japanese Patent Application JP 2004-061421, filed in the Japanese Patent Office on Mar. 4, 2004, the entire contents of which are incorporated herein by reference.

BACKGROUND ART

Among recordable optical discs, there is known an optical disc exploiting e.g. a phase change film. In these recordable optical discs, a spirally extending land(s) and a spirally extending groove(s) are formed. Of these, the grooves are used as recording tracks in which to record data.

Moreover, in these recordable optical discs, on the recording tracks or grooves of which data can be recorded, wobble signals or LPP (land pre pit) signals are prerecorded in edge parts of the recording tracks, that is, in boundary portions of the recording tracks with respect to the grooves.

The wobble signals are those signals recorded by meandering of boundary portions of the land(s) and the groove(s) at a preset period. The meandering shape is such that, when the disc is reproduced at CLV (constant linear velocity) or at CAV (constant angular velocity), the meandering has a preset constant period. For this reason, the wobble signals are used as clocks. The meandering frequency is sometimes modulated by e.g. addresses, in which case a reproduced signal is also used as address information.

The LPP signal is such a signal recorded by forming a pit in a portion of the land. With the LPP signals, the string of pits formed represents an address, such that reproduced signals are used as the address information.

The wobble signals and the LPP signals are detected from return light of laser light illuminated on the recording track (recording groove). In the return light of laser light illuminated on the recording track (recording groove), the wobble signal components and the LPP signal components are contained in the push-pull component (differential component) along the radial direction of the return light.

Specifically, the main laser light beam, illuminated on the recording track (groove), is detected by a four-segment photodetector 101 shown in FIG. 2. The four-segment photodetector 101 is split into two portions along a direction corresponding to the radial direction of the optical disc, while being split into two portions along a direction corresponding to its tangential direction. That is, the four-segment photodetector is split into four portions in a cross-shape. The wobble signal and the LPP signal are included in a differential component of the total light volume (A+D) of the photodetector segments A and D on one side, here on the outer rim side, of the photodetector segments divided along the direction corresponding to the radial direction, and the total light volume (B+C) of the photodetector segments B and C on the other side, here on the inner rim side, of the photodetector segments, that is, ((A+D)−(B+C)). This signal ((A+D)−(B+C)), representing the differential component, is referred to below as the radial push-pull signal.

Of course, these wobble and LPP signals need to be read out not only during readout of data from the recording track but also during recording the data.

For detecting the wobble and LPP signals during data recording, the reflected light of the laser light radiated for recording is detected to generate the radial push-pull signal.

With the phase change disc, for example, pits are recorded by radiating laser light as pulses. Hence, during recording, there is a timing during which pits are being formed on the recording track (write time) and a timing during which pits are not being formed on the recording track (bias time). Thus, in the return light during recording, the signal level during writing (pit level) and the signal level during bias time (read level) become higher and lower, respectively, as shown in FIG. 3.

For this reason, in detecting the wobble and LPP signals during recording, signal processing must be made in such a manner that changes in the light volume of return light during writing and those during bias timing will be sufficiently taken into consideration.

Meanwhile, there are occasions where, even though the light spot illuminated on the optical disc is illuminated on the center of a recording track, the center of the light spot of the return light is not coincident with the center position of the four-segment photodetector 101, as shown in FIG. 4.

There are also occasions where light volume distribution is not symmetrical but distorted relative to the center of the light spot illuminated to the four-segment photodetector 101.

Hence, a time averaged value of the total light volume of the outer rim side photodetector segments (A+D) when the four-segment photodetector 101 is divided into two portions along a line corresponding to the radial direction differs from a time averaged value of the total light volume of the inner rim side photodetector segments (B+C), such that the radial push-pull signal (A+D−(B+C)) is added by an offset.

Moreover, there is a marked difference in the power during the write timing and that during the bias timing. The result is that there is produced a large level difference between an offset $E_1$ of the radial push-pull signal during writing, that is, the difference in the pit level during writing, and an offset $E_2$ of the radial push-pull signal during bias timing, that is, the difference in the read level during bias timing, as shown in FIG. 5. That is, there is produced time change in the offset of the radial push-pull signal, as shown in FIG. 6.

These variations in the offset are conductive to deterioration of the slew rate or generation of ringing, when the detection signals A to D of the four-segment photodetector are transmitted to the downstream side circuitry, as a result of which reproduction characteristics of the wobbles or LPP signals, generated from the radial push-pull signal, are deteriorated.

These problems are felt more keenly when the data are recorded by multiple-speed recording on the optical disc.

DISCLOSURE OF THE INVENTION

Problems to be Solved by the Invention

It is an object of the present invention to provide an optical disc apparatus, an optical head device, and a light detection unit for an optical head, in which, even if electrical detection signals are varied due to misregistration in the relative positions of photodetector segments and the return light in e.g. the radial direction, or to variations in the return light, signals contained during recording in the radial push-pull signal, such as wobble signals or land pre-pit signals, may be reproduced with optimum characteristics.

In one aspect, the present invention provides an optical disc apparatus for recording the information on an optical disc, in which the optical disc apparatus comprises an optical head device including a laser light emitting unit for radiating laser light to the optical disc, a light detection unit illuminated by return light of radiated laser light to generate an electrical signal containing information components obtained from the optical disc responsive to the illuminating return light, and a signal processing circuit performing control for reproducing signals recorded on the optical disc or for recording signals on the optical disc, responsive to the electrical signal output from the optical head device. The light detection unit includes a photoelectric converter unit divided into at least two portions along a direction corresponding to the radial direction of the optical disc, a multiplication circuit for multiplying an electrical signal generated by one of the two portions of the photoelectric converter unit, obtained by division in the direction corresponding to the radial direction of the optical disc, with a coefficient t, and a differential circuit for calculating the difference between the electrical signal generated by the other of the two portions of the photoelectric converter unit obtained by division in the direction corresponding to the radial direction of the optical disc and the electrical signal output from the multiplication circuit to generate a radial push-pull signal. The coefficient t is set to a value corresponding to a ratio of the volume of return light illuminated on one of the two portions of the photoelectric converter unit and the volume of return light illuminated on the other of the two portions of the photoelectric converter unit.

In another aspect, the present invention provides a light detection unit for an optical head device configured for radiating laser light to an optical disc for recording and/or reproducing signals for the optical disc, in which the light detection unit comprises a photoelectric converter unit divided into at least two portions along a direction corresponding to the radial direction of the optical disc, a multiplication circuit for multiplying an electrical signal, generated by one of the two portions of the photoelectric converter unit, obtained by division along a direction corresponding to the radial direction of the optical disc, with a coefficient t, and a differential circuit for calculating a difference between an electrical signal generated by the other of the portions of the photoelectric converter unit obtained by division in a direction corresponding to the radial direction of the optical disc and an electrical signal output from the multiplication circuit to generate a radial push-pull signal. The coefficient t is set to a value corresponding to a ratio of the light volume of return light illuminated on the one of the two portions of the photoelectric converter unit and the light volume of return light illuminated on the other of the two portions.

In yet another aspect, the present invention provides an optical head device comprising a laser light emitting unit for radiating laser light to an optical disc, and a light detection unit illuminated by return light of radiated laser light for generating an electrical signal containing information components obtained from the optical disc responsive to illuminated return light. The light detection unit includes a photoelectric converter unit divided into at least two portions along a direction corresponding to the radial direction of the optical disc, a multiplication circuit for multiplying an electrical signal generated by one of the two portions of the photoelectric converter unit obtained by division along a direction corresponding to the radial direction of the optical disc with a coefficient t, and a differential circuit for calculating a difference between an electrical signal generated by the other of the portions of the photoelectric converter unit obtained by division in a direction corresponding to the radial direction of the optical disc, and an electrical signal output from the multiplication circuit, to generate a radial push-pull signal. The coefficient t is set to a value corresponding to a ratio of the light volume of return light illuminated on the one of the two portions of the photoelectric converter unit and the light volume of return light illuminated on the other of the two portions.

BRIEF DESCRIPTION OF THE DRAWINGS

FIGS. 9A and 9B show the structure of a light detecting unit device in the optical head device.

BEST MODE FOR CARRYING OUT THE INVENTION

First Optical Disc Drive

A first optical disc drive, embodying the present invention, will now be explained in detail.

(Overall Structure of Optical Disc Drive)

Figure 1:
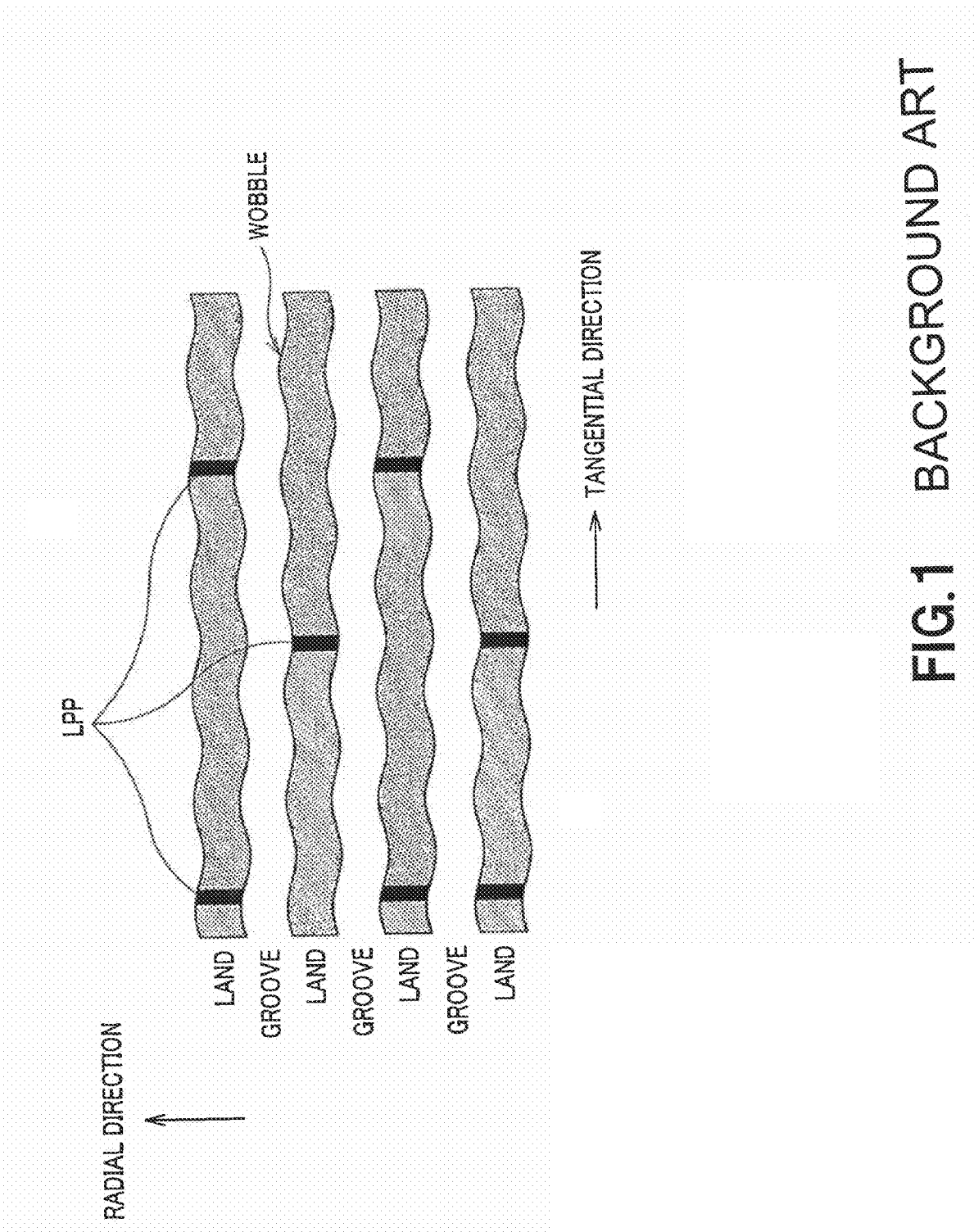
FIG. 1 illustrates a wobble signal and a PLL signal.
Figure 2:
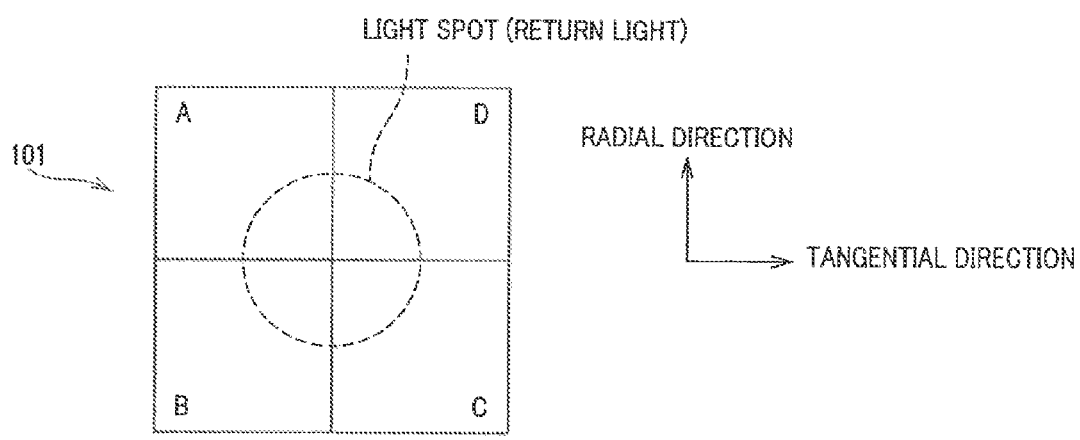
FIG. 2 shows a four-segment light detecting unit.
Figure 3:
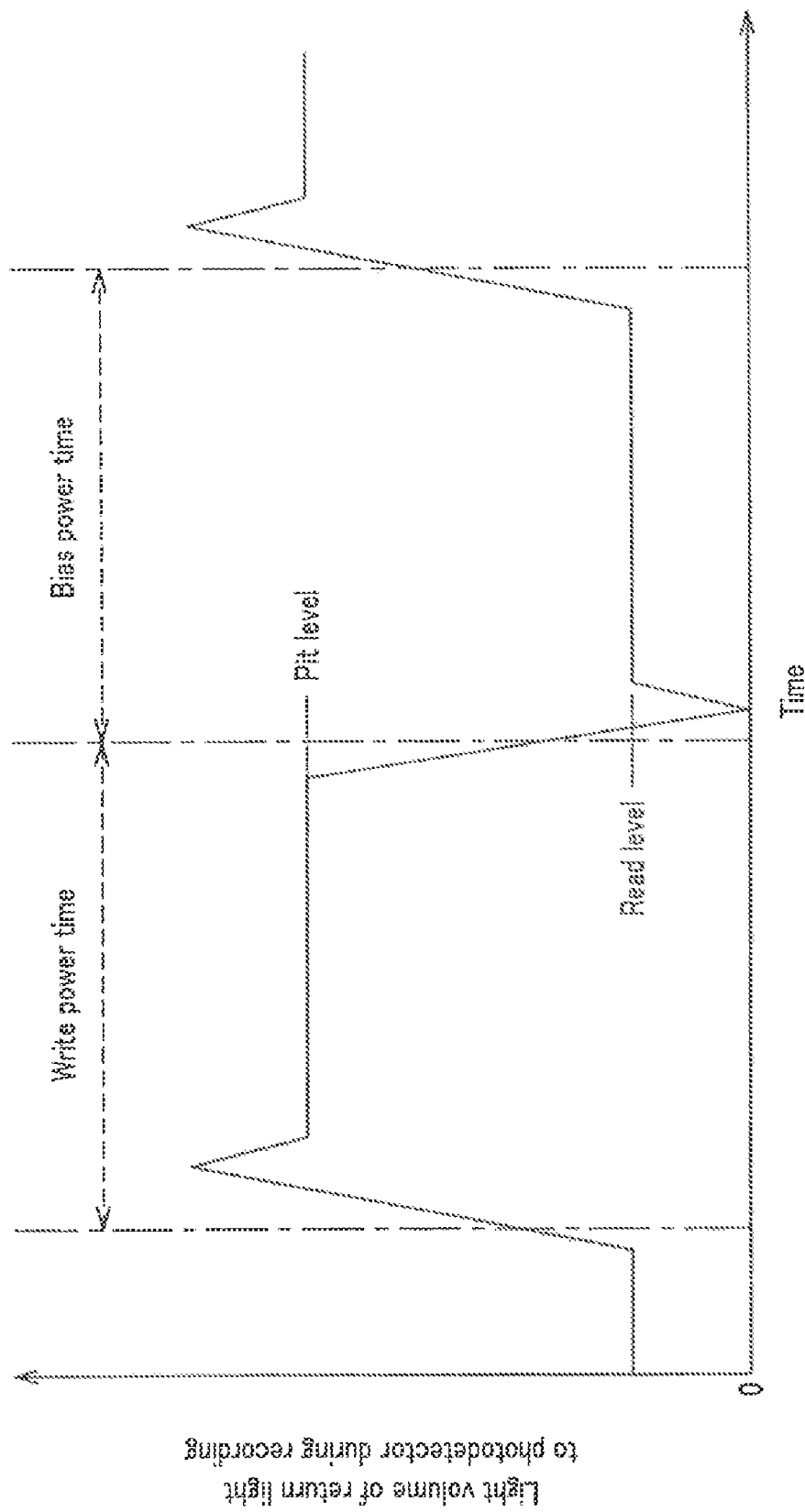
FIG. 3 illustrates the light volume of return light during recording.
Figure 4:
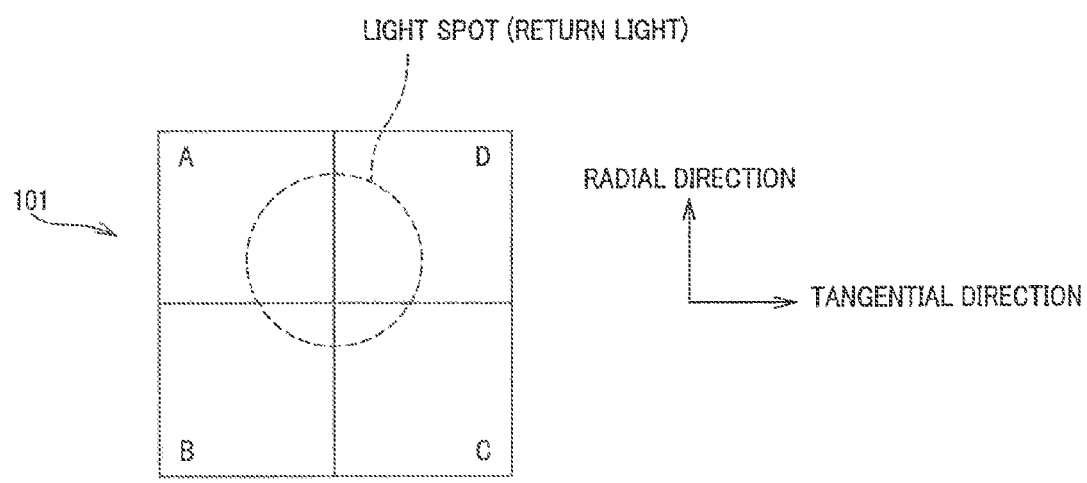
FIG. 4 illustrates the misregistration of a light spot with respect to the four-segment light detecting unit.
Figure 5:
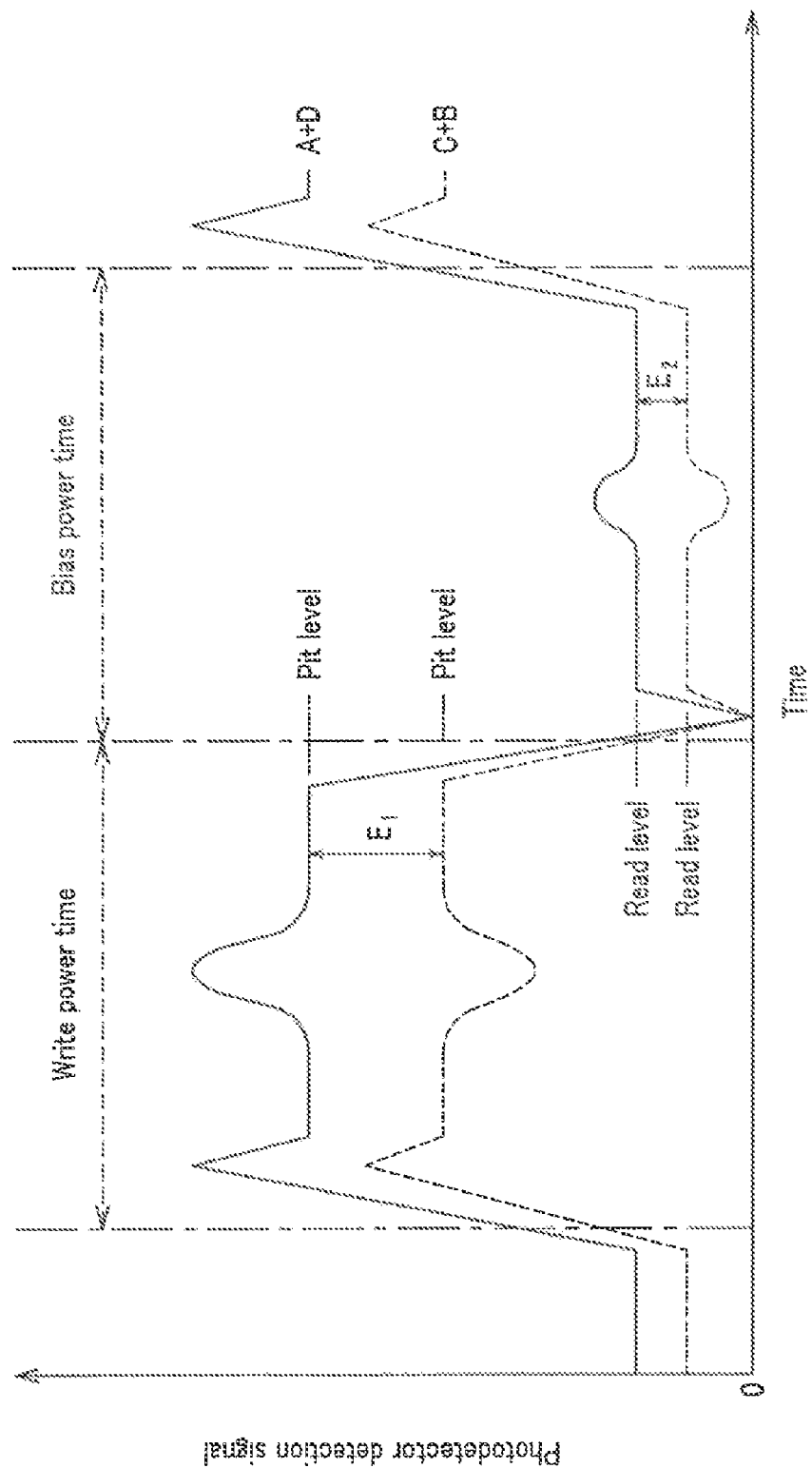
FIG. 5 illustrates the offset of a radial push-pull signal at the time of writing and the offset of the radial push-pull signal during bias timing.
Figure 6:
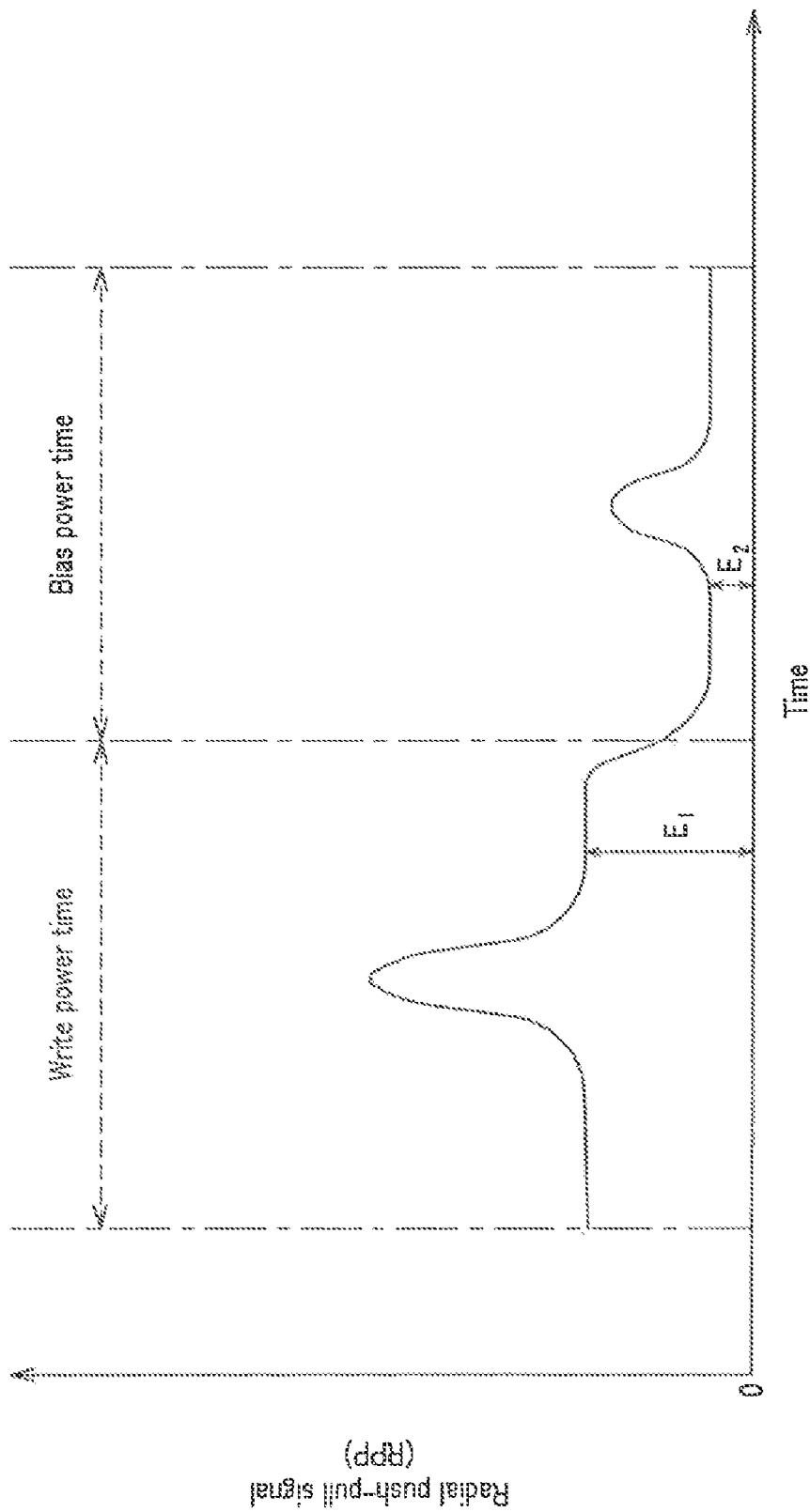
FIG. 6 illustrates time changes of the offset of the radial push-pull signal.
Figure 7:
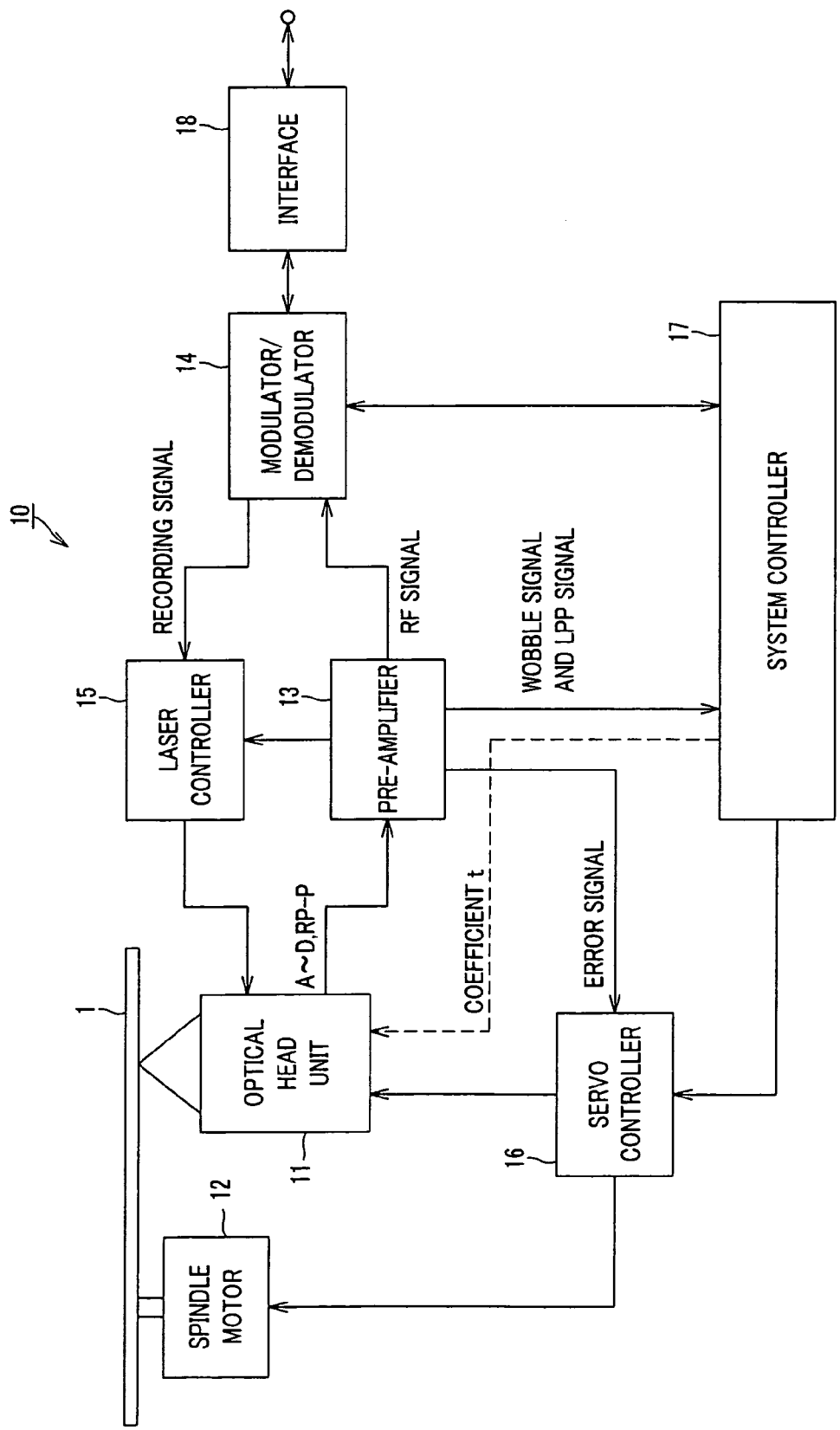
FIG. 7 is a block diagram of an optical disc drive embodying the present invention.

FIG. 7 shows an overall block structure of an optical disc drive 10 embodying the present invention.

The optical disc drive 10 records and/or reproduces the information on or from a recordable optical disc, which may be a phase change optical disc or a write-once optical disc (DVD-R, DVD-RW, DVD+R, DVD+RW or DVD-RAM).

A spirally extending land and a spirally extending groove are formed in the optical disc 1. Of these, the groove is used as a recording track. In the optical disc 1, data may be recorded on the recording track (groove), whilst a wobble signal and an LPP signal are prerecorded in the boundary portions of the recording track. Although the optical disc 1 in the present embodiment is a DVD disc, the present invention is not limited to the DVD, such that any suitable optical disc may be used in which there are provided the wobble signal and LPP signal.

The optical disc drive 10 includes an optical head device 11, a spindle motor 12, a preamplifier 13, a modulator/demodulator 14, a laser controller 15, a servo controller 16, a system controller 17 and an interface 18.

The optical head device 11 radiates laser light to the optical disc 1 to record the information thereon, while detecting the return light radiated to and reflected back from the optical disc to generate a wide range of electrical detection signals (detector signals A to D and the radial push-pull signal R-PP). Meanwhile, details of the inner structure of the optical head device 11 or details of the detection signals (A to D and R-PP) will be explained subsequently. The optical head device 11, also called an optical pickup, is here referred to as the optical head device.

The spindle motor 12 holds the optical disc 1, and causes rotation of the optical disc 1 for recording and/or reproduction.

The preamplifier 13 generates e.g. reproduction signals or error signals, based on the detection signals (A to D and R-PP) output from the optical head device 11. Specifically, the pre-amplifier 13 generates RF signals, representing pit strings, recorded on the recording track of the optical disc 1, wobble signals, LPP signals, and error signals (focusing error signals, tracking error signals or sled error signals) needed for servo control.

During reproduction, the modulator/demodulator 14 demodulates and decodes the RF signals, generated by the pre-amplifier 13, to generate a string of reproduced data. The string of reproduced data, generated by the modulator/demodulator 14, is transmitted through the interface 18 to a host device provided with the optical disc drive 10. During recording, the modulator/demodulator 14 is supplied with recording data supplied thereto via interface 18 from the host device provided with the optical disc drive 10. The modulator/demodulator 14 encodes and modulates the input string of the recording data to convert the string of the recording data into recording signals. The recording signals, generated by the modulator/demodulator 14, are supplied to the laser controller 15.

The laser controller 15 controls the power of laser light radiated from the optical head device 11. During reproduction, the laser controller 15 stabilizes the laser power to a preset value. During reproduction, the laser controller 15 radiates laser light in the form of pulses, in accordance with a preset write strategy, responsive to recording signals input from the modulator/demodulator 14.

The servo controller 16 manages focusing control, tracking control, sled control and skew (tilt) control of the recording and/or reproducing device 1, while managing rotational speed control of the spindle motor 12, based on error signals generated by the preamplifier 13 and on control signals from the system controller 17.

The system controller 17 controls the respective circuits of the optical disc drive 10. During recording and reproduction, the system controller 17 generates clocks or the address information from the wobble signal and LPP signal generated by the preamplifier 13. Based on the reproduced address information, the system controller 17 controls the data write and readout positions for the optical disc 1.

The system controller 17 also generates a coefficient t, which is a value used for the optical head device 11 to generate the radial push-pull signal. The system controller 17 sends the calculated coefficient t to the optical head device 11. The method for calculating the coefficient t will be explained subsequently.

(Optical Head Device)

The optical head device 11 will be explained further.

The optical head device 11 radiates laser light to the optical disc 1 to record the information on the optical disc 1, while detecting and receiving the return light reflected back from the optical disc 1 to generate a large variety of electrical detection signals (the detector signals A to D and the radial push-pull signal R-PP).

Figure 8:
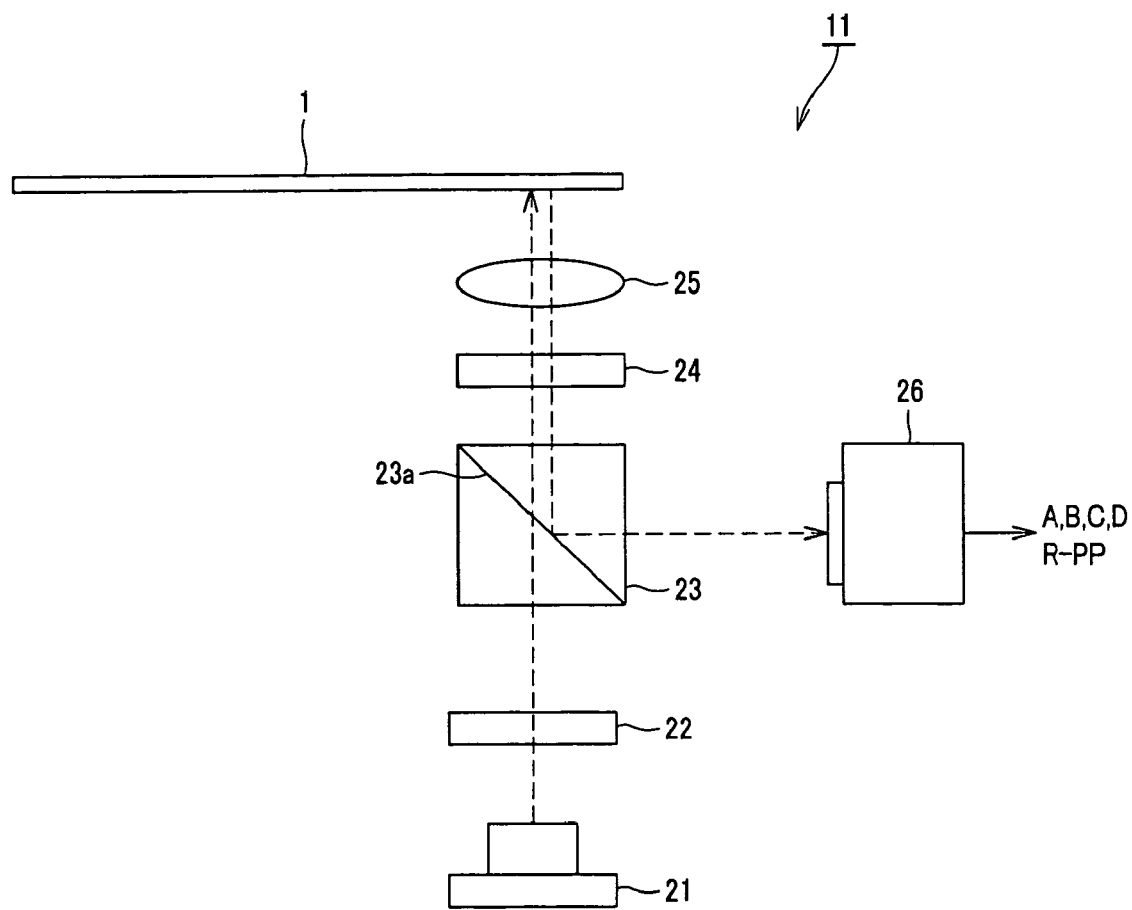
FIG. 8 shows the structure of an optical head device in the optical disc drive.
Figure 10:
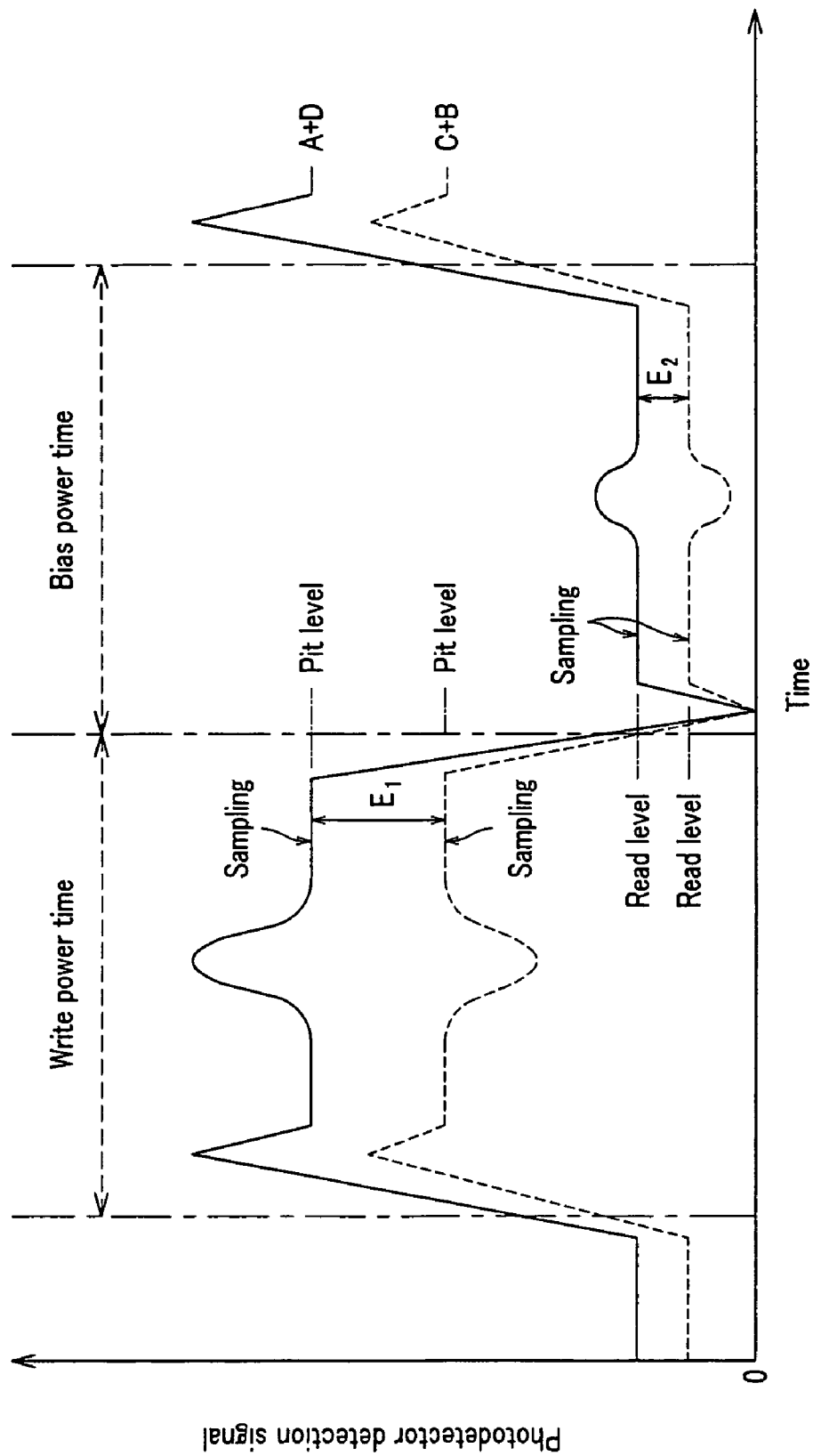
FIG. 10 shows a signal (A+D) representing the light volume of the outer rim side light detecting unit and a signal (B+C) representing the light volume of the inner rim side light detecting unit.

Referring to FIG. 8, the optical head device 11 includes a laser diode 21, a collimator lens 22, a polarization beam splitter 23, a quarter wave plate 24, an objective lens 25 and a light detecting unit 26.

The laser diode 21 is a laser light radiating source for radiating laser light to the optical disc 1. The laser light radiated from the laser diode 21 has its power controlled by the laser controller 15.

The laser light radiated from the laser diode 21 is sequentially transmitted through the collimator lens 22, polarization beam splitter 23, quarter wave plate 24 and the objective lens 25, so as to be illuminated on the optical disc 1.

The collimator lens 22 waveform-shapes the incident laser light into a collimated light beam. The polarization beam splitter 23 splits the incident laser light beam into an S-polarized light component and a P-polarized light component on a light splitting surface 23a. Only the P-polarized light component, which has passed through the polarization beam splitter 23, is incident on the quarter wave plate 24, which then converts the P-polarized light component into a rotating polarized light beam. The objective lens 25 condenses laser light incident as a collimated light beam to illuminate the so condensed light beam on a recording surface of the optical disc 1. The objective lens 25 is held by a biaxial actuator driven from the servo controller 16. This servo controller 16 controls the objective lens 25 to perform focusing control and tracking control of the condensing position of the laser light beam.

The laser light illuminated on the optical disc 1 is reflected in accordance with optical characteristics of the recording surface of the optical disc 1. The laser light reflected by the optical disc 1, also termed the return light, is returned along the light path which is the same as the incident light path insofar as the light path from the objective lens 24 up to the polarization beam splitter 23 is concerned. That is, the return light from the optical disc 1 is transmitted through the objective lens 25 and the quarter wave plate 24 so as to be illuminated on the polarization beam splitter 23. The quarter wave plate 24 converts the return light from the optical disc 1, as rotationally polarized light, into linearly polarized light. Hence, the return light, as S-polarized light, falls on the light splitting surface 23a of the polarization beam splitter 23. The polarization beam splitter 23 reflects the return light, as S-polarized light, by its light splitting surface 23a. The return light, reflected back from the polarization beam splitter 23, is incident on the light detecting unit 26.

The light detecting unit 26 receives the incident return light, reflected back from the optical disc 1, to convert the return light into an electrical signal, the values of which are proportional to the light volume of the received return light. The light detecting unit 26 generates a large variety of detection signals (A, B, C, D and R-PP) from the electrical signal. These detection signals are then output. With the light detecting unit 26, the functions described above are packaged in a sole semiconductor chip.

A more specified structure of the light detecting unit 26 will now be explained in further detail.

(Light Detecting Unit)

FIG. 9 illustrates the inner structure of the light detecting unit 26.

Referring to FIG. 9B, the light detecting unit 26 includes a four-segment light detecting unit 30. This four-segment photodetector 30 is a photo-electrical converting device having a substantially square-shaped light receiving surface which is illuminated by return light reflected back from the optical disc 1. Referring to FIG. 9A, when a spot L is in a just-focus and just-track state relative to a recording track (groove), there is generated a corresponding spot L' on the light receiving surface of the four-segment photodetector 30, as shown in FIG. 9B.

The four-segment photodetector 30 is divided into two parts along a direction optically corresponding to the radial direction of the optical disc 1, that is, the direction proceeding from the center to the outer rim of the disc, while being divided into two parts along a direction optically corresponding to the tangential direction of the optical disc 1, that is, the direction parallel to the recording track. That is, the four-segment photodetector 30 is split into four photodetector segments in a cross-shape along the radial and tangential directions. The respective photodetector segments of the photodetector 30 perform photo-electrical conversion independently of one another to output respective independent detection signals. That is, the respective photodetector segments of the photodetector 30 output the currents, conforming to the illuminated light volumes, independently of one another.

It is now assumed that the four-segment photodetector 30 is divided into four photodetector segments, namely a first photodetector segment 30A, a second photodetector segment 30B, a third photodetector segment 30C and a fourth photodetector segment 30D. The first photodetector segment 30A is located forwards along the recording direction when the photodetector 30 is split along the tangential direction and radially outwards when the photodetector 30 is split along the radial direction. The second photodetector segment 30B is located forwards along the recording direction when the photodetector 30 is split along the tangential direction and radially inwards when the photodetector 30 is split along the radial direction. The third photodetector segment 30C is located backwards along the recording direction when the photodetector 30 is split along the tangential direction and radially inwards when the photodetector 30 is split along the radial direction. The fourth photodetector segment 30D is located backwards along the recording direction when the photodetector 30 is split along the tangential direction and radially outwards when the photodetector 30 is split along the radial direction.

The light detecting unit 26 includes a first current-to-voltage converter 31A, a second current-to-voltage converter 31B, a third current-to-voltage converter 31C and a fourth current-to-voltage converter 31D.

The first current-to-voltage converter 31A converts the current, output from the first photodetector segment 30A, into a voltage signal A, that is, generates the voltage signal A proportionate to the light volume illuminated on the first photodetector segment 30A.

The second current-to-voltage converter 31B converts the current, output from the second photodetector segment 30B, into a voltage signal B, that is, generates the voltage signal B proportionate to the light volume illuminated on the second photodetector segment 30B.

The third current-to-voltage converter 31C converts the current, output from the third photodetector segment 30C, into a voltage signal C, that is, generates the voltage signal C proportionate to the light volume illuminated on the third photodetector segment 30C.

The fourth current-to-voltage converter 31D converts the current, output from the fourth photodetector segment 30D, into a voltage signal D, that is, generates the voltage signal D proportionate to the light volume illuminated on the fourth photodetector segment 30D.

The voltage signals A to D, generated by these first to fourth current-to-voltage converters 31A to 31D, are output to the pre-amplifier 13, as detector signals A to D, respectively, via output terminals 32A to 32D, respectively. The pre-amplifier 13 sums these detector signals A to D together to generate e.g. RF signals, calculates the radial push-pull component ((A+D)−(B+C)) to generate tracking error signals, or calculates a differential signal along the diagonal direction (A+C−(B+D)) to generate focusing error signals.

The light detecting unit 26 also includes a push-pull signal generator 33. This push-pull signal generator 33 generates the radial push-pull signal (R-PP) used for calculating the wobble signal and the R-PP signal.

It is noted that the radial push-pull signal (R-PP) represents a differential component of a sum light volume (A+D), as a total light volume of the photodetector segments A and D, and a sum light volume (B+C), as a total light volume of the photodetector segments B and C. The photodetector segments A, D and the photodetector segment B, C are the photodetector segments lying on one side, assumed here to be on the radially outer side, and on the opposite side, assumed here to be on the radially inner side, when the four-segment photodetector 30 is divided into two along the radial direction, respectively.

The radial push-pull signal (R-PP) contains signals recorded on the boundary portion (edge portion) of a recording track. That is, the wobble signal components and LPP signal components are contained in the radial push-pull signal (R-PP).

Specifically, the push-pull signal generator 33 includes a first adder 41, a second adder 42, a multiplier 43 and a subtractor 44.

The push-pull signal generator 33 is supplied with the voltage signals A to D, output from the first to fourth current-to-voltage converters 31A to 31D, respectively. The push-pull signal generator 33 is supplied with the coefficient t from the system controller 17 provided outside the light detecting unit 26.

The first adder 41 is supplied with the voltage signals A and D and sums these voltage signals together to generate the signal (A+D). That is, the first adder 41 generates a signal representing the volume of light beams illuminated on the radially outer photodetector segments (30A, 30D) when the four-segment photodetector 30 has been split in two parts along the radial direction.

The second adder 42 is supplied with the voltage signals B and C and sums these voltage signals together to generate the signal (B+C). That is, the second adder 42 generates a signal representing the volume of light beams illuminated on the radially inner photodetector segments (30B, 30C) when the four-segment photodetector 30 has been split in two parts along the radial direction.

The multiplier 43 multiplies the signal (B+C), generated by the second adder 42, with the coefficient t, entered from outside, to generate a signal (t×(B+C)).

The subtractor 44 subtracts the signal (t×(B+C)), generated by the multiplier 43, from the signal (A+D), generated by the first adder 41, to generate the signal ((A+D)−t×(B+C)).

The push-pull signal generator 33 outputs the signal, generated by the subtractor 44, as the radial push-pull signal (R-PP). The radial push-pull signal ((A+D)−t×(B+C)) is sent to the pre-amplifier 13 via terminal 34.

The radial push-pull signal (R-PP), found as described above, is used by the pre-amplifier 13 for calculating the wobble signal and the LPP signal.

(Method for Calculating the Coefficient t)

The coefficient t will now be explained.

Ideally, the relationship between the spot L on a recording track and the spot L' formed on the four-segment photodetector 30 is such that, if the center of the spot L is at the center of the recording track, the center of the spot L' associated with it is also located at the center of the photodetector 30, as shown in FIG. 9. Moreover, the spot L', formed on the four-segment photodetector 30, desirably has equal light volume distribution along the radial direction, with the center of the light receiving surface as center of symmetry.

However, in actuality, the center position of the spot L' suffers from offsets along the radial direction, due to errors of the optical or mechanical system, whilst the light volume distribution along the radial direction of the spot L' also is not equal.

The coefficient t is set to such a value which will correct these offsets.

It is assumed that the center of a recording track is illuminated by the spot L of an ideal light volume distribution. The coefficient t is set to a value related with a ratio of the total volume of light (A+D) illuminated on the outer rim side photodetector segments 30A and 30D in case the four-segment photodetector 30 is split in two along the radial direction, under the above premises, and the total volume of light (B+C) illuminated on the inner rim side photodetector segments 30B and 30C.

Specifically, the system controller 17 calculates the coefficient 17 as indicated in the following.

First, during the initial operations, such as at the time of loading the optical disc 1 or power up, the system controller 17 detects the signal (A+D) and (B+C) from the pre-amplifier 13. That is, the system controller detects, from the preamplifier 13, the total light volume (A+D) of light illuminated on the outer rim side photodetector segments 30A and 30D, and the total light volume (B+C) of light illuminated on the inner rim side photodetector segments 30B and 30C. The system controller 17 then calculates the ratio of the two signals ((B+C)/(A+D)). The system controller 17 converts the so calculated ratio ((B+C)/(A+D)) into a value matched to the multiplier 43, and sets the value, thus found on conversion, as the coefficient t. The value matched to the multiplier is a value for selecting a switch if the system is such a one as changes over a resistor to cause a change in the gain.

The system controller 17 sends the coefficient t thus found to the light detecting unit 26 in the optical head device 11 to cause the as-corrected radial push-pull signal ((A+D)−t×(B+C)) to be output from the light detecting unit 26.

Although the coefficient t is calculated and set in the present device by the system controller 17, it is also possible to provide a circuit for calculating the signal ratio ((B+C)/(A+D)) in the light detecting unit 26 and to set the coefficient t in the light detecting unit 26.

(Method for Processing Wobble and LPP Signals and Fine Adjustment of the Coefficient t)

If, in the above-described optical disc drive 10, data is to be reproduced from or recorded on the optical disc 1, wobble signals and LPP signals are extracted from the radial push-pull signal by the pre-amplifier 13.

Specifically, during the reproduction and recording, the pre-amplifier 13 is supplied with the radial push-pull signal (R-PP), that is, ((A+D)−t×(B+C)), output from the optical head device 11, and performs band-pass filtering on this signal (R-PP) to generate the wobble signal and the LPP signal. The preamplifier 13 sends the so generated wobble and LPP signals to the system controller 17.

Based on these wobble and LPP signals, the system controller 17 generates clock signals, while executing e.g. address calculating processing.

The system controller 17 may also effect fine adjustment of the coefficient t depending on the error rate in the wobble signal and the LPP signal.

Specifically, the system controller calculates the error correction code of the wobble signal or the LPP signal to calculate the error rate in the wobble signal and the LPP signal. The system controller 17 also effects fine adjustment of the coefficient t, during the recording operation when the variations in the radial push-pull signal are increased, so that the error rate will be as small as possible. That is, the system controller 17 monitors the error rate of the wobble signal or the LPP signal, during the recording operation, to effect fine adjustment of the coefficient t so that this error rate will be minimized.

By adjusting the coefficient t during the recording, the radial push-pull signal may be generated more accurately.

(Favorable Effect of Applying the Present Invention to the Optical Disc Drive)

With the optical disc drive 10, described above, the as-corrected radial push-pull signal ((A+D)−t×(B+C)) is generated within the optical head device 11.

Figure 11:
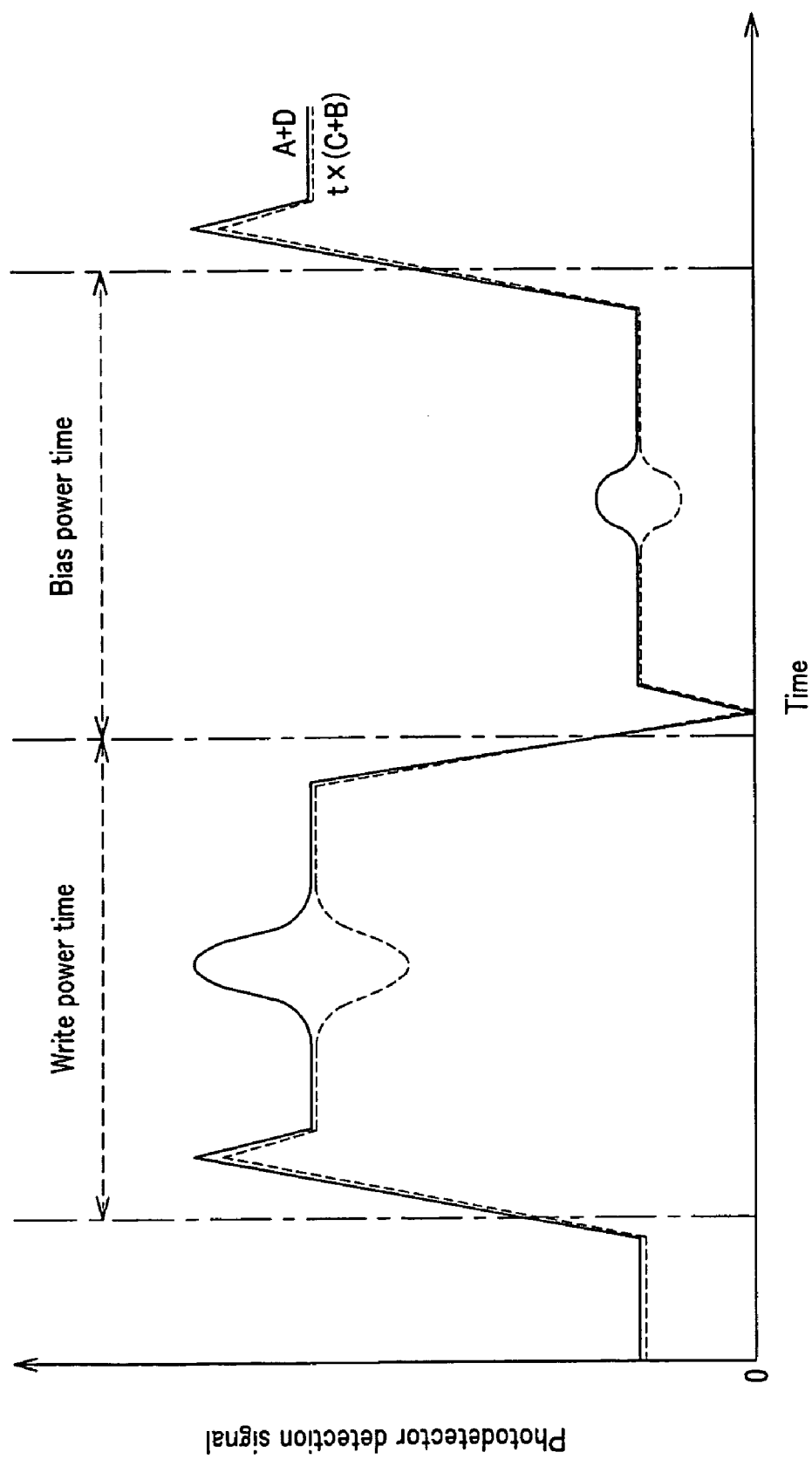
FIG. 11 shows a signal (A+D) representing the light volume of the outer rim side light detecting unit and a corrected signal (t×(B+C)) representing the light volume of the inner rim side light detecting unit.

Thus, even if level differences ($E_1$, $E_2$) between the signal (A+D) representing the volume of light illuminated on the outer rim side photodetector segments (30A, 30D) and the signal (B+C) representing the volume of light illuminated on the inner rim side photodetector segments (30B, 30C), are produced owing to optical or mechanical errors, one of these signals, here the inner rim side signal (B+C), is corrected, depending on the level ratio, so that the average levels of the two signals, or the levels sampled at preset timing, coincide with each other, as shown in FIG. 11.

Figure 12:
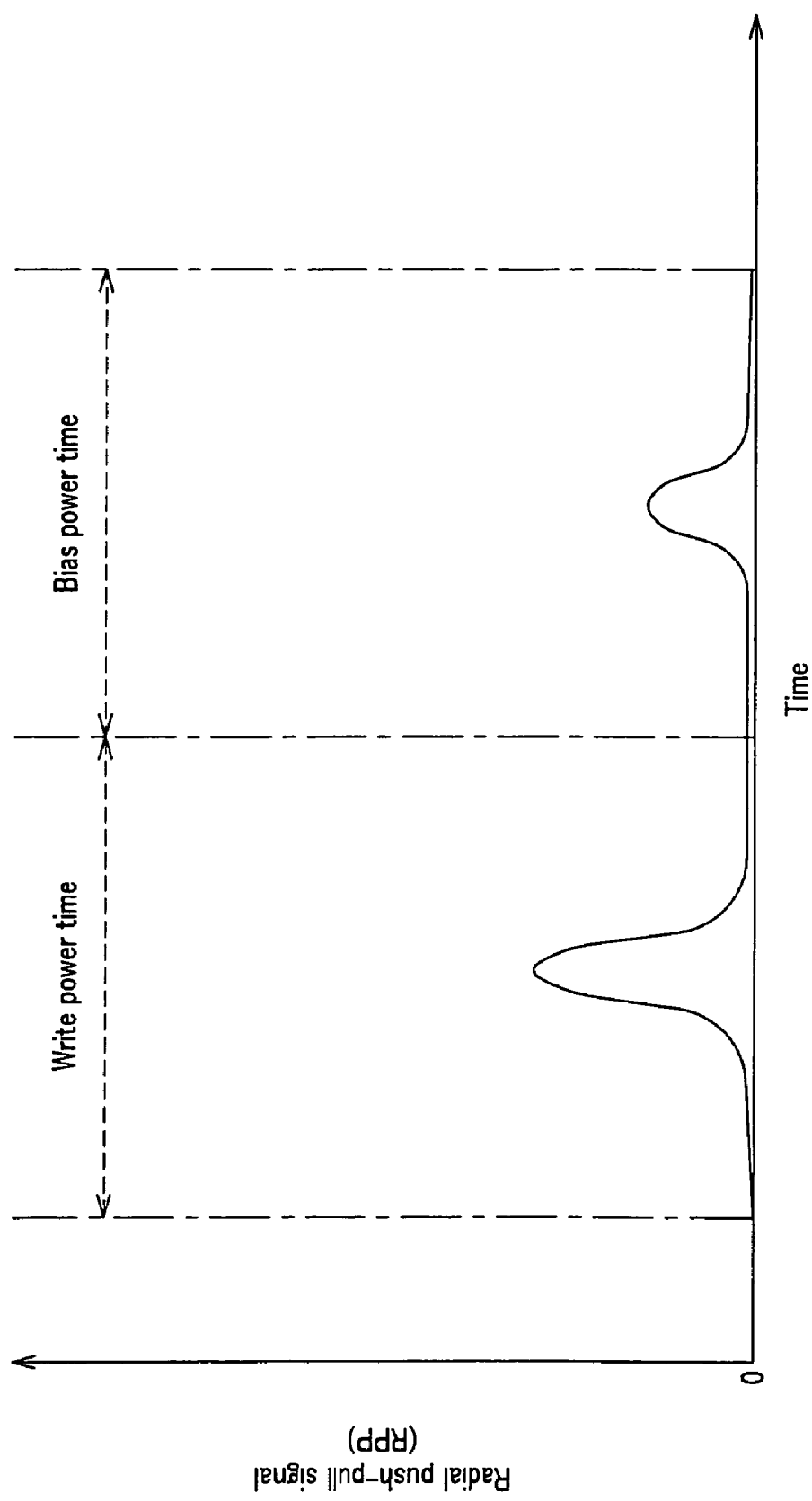
FIG. 12 shows a radial push-pull signal detected by the optical head device.

The result is that the offset in the radial push-pull signal (R-PP) becomes extremely small, as shown in FIG. 12. That is, the difference between the offset at the time of writing and that at the time of biasing becomes extremely small, so that there is no risk of ringing in the radial push-pull signal (R-PP) or deterioration in the slew rate.

Thus, with the optical disc drive 10, the wobble and LPP signals can be detected accurately.

Second Disc Drive

An optical disc drive 50, which is a modification of the optical disc drive 10, will now be explained. Meanwhile, in the explanation of the optical disc drive 50, parts or components which are the same as those of the optical disc drive 10 are denoted by the same reference numerals in the drawing and detailed description thereof is omitted for simplicity.

(Overall Structure)

Figure 13:
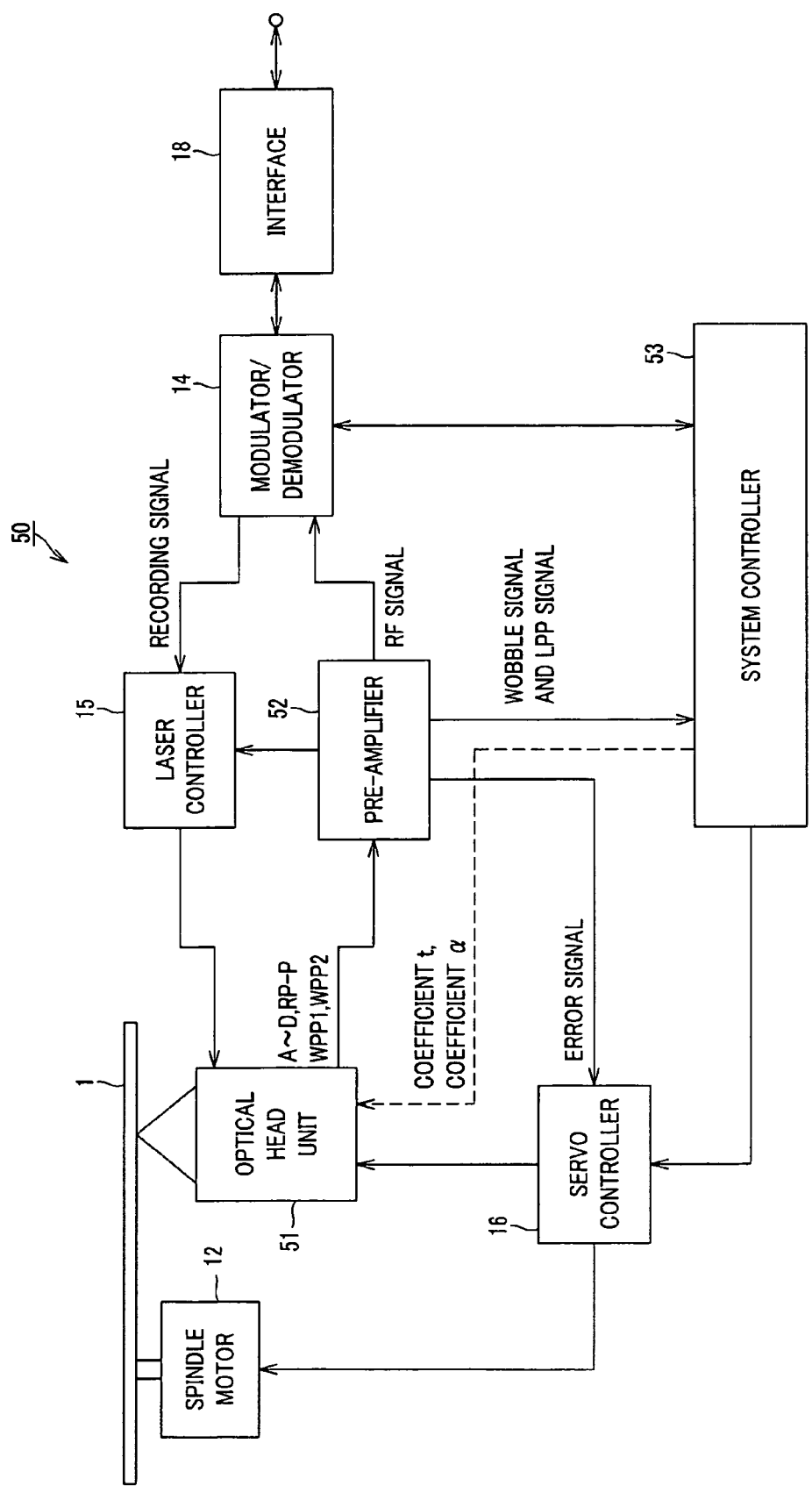
FIG. 13 is a block diagram of a further optical disc drive embodying the present invention.

FIG. 13 depicts an overall block diagram of the optical disc drive 50.

The optical disc drive 50 is a unit for recording or reproducing the digital information on or from a recordable optical disc 1.

The optical disc drive 50 includes an optical head unit 51, a spindle motor 12, a pre-amplifier 52, a modulator/demodulator 14, a laser controller 15, a system controller 53 and an interface 18.

The optical head unit 51 radiates laser light to the optical head unit 51 to record the information thereon, and detects return light radiated towards and reflected back from the optical disc 1 to receive the return light to generate a wide range of electrical detection signals (detection signals A to D, radial push-pull signal (R-PP), a first correction signal WPP1 and a second correction signal WPP2).

The preamplifier 52 generates RF signals, wobble signals, LPP signals and error signals, based on the detection signals (A to D, R-PP, WPP1 and WPP2), output from the optical head device 51.

The system controller 53 controls the various circuits of the optical disc drive 50. During recording and reproduction, the system controller 53 generates clocks or the address information from the wobble signal or the LPP signal generated by the pre-amplifier 52. Based on the reproduced address information, the system controller 53 controls the data write position and the data readout position for the optical disc 1.

The system controller 53 also generates the coefficient t, which is a value used by the optical head unit 51 in generating the radial push-pull signal (R-PP). The system controller 53 sends the so calculated coefficient t to the optical head device 51. The system controller 53 also generates a coefficient $\alpha$, which is a value used in generating the signals WPP1 and WPP2. The system controller 53 sends the so calculated coefficient t to the optical head unit 51. The methods of calculating the coefficients $\alpha$ and t will be explained subsequently.

(Optical Head Device and Light Detection Unit)

Figure 14:
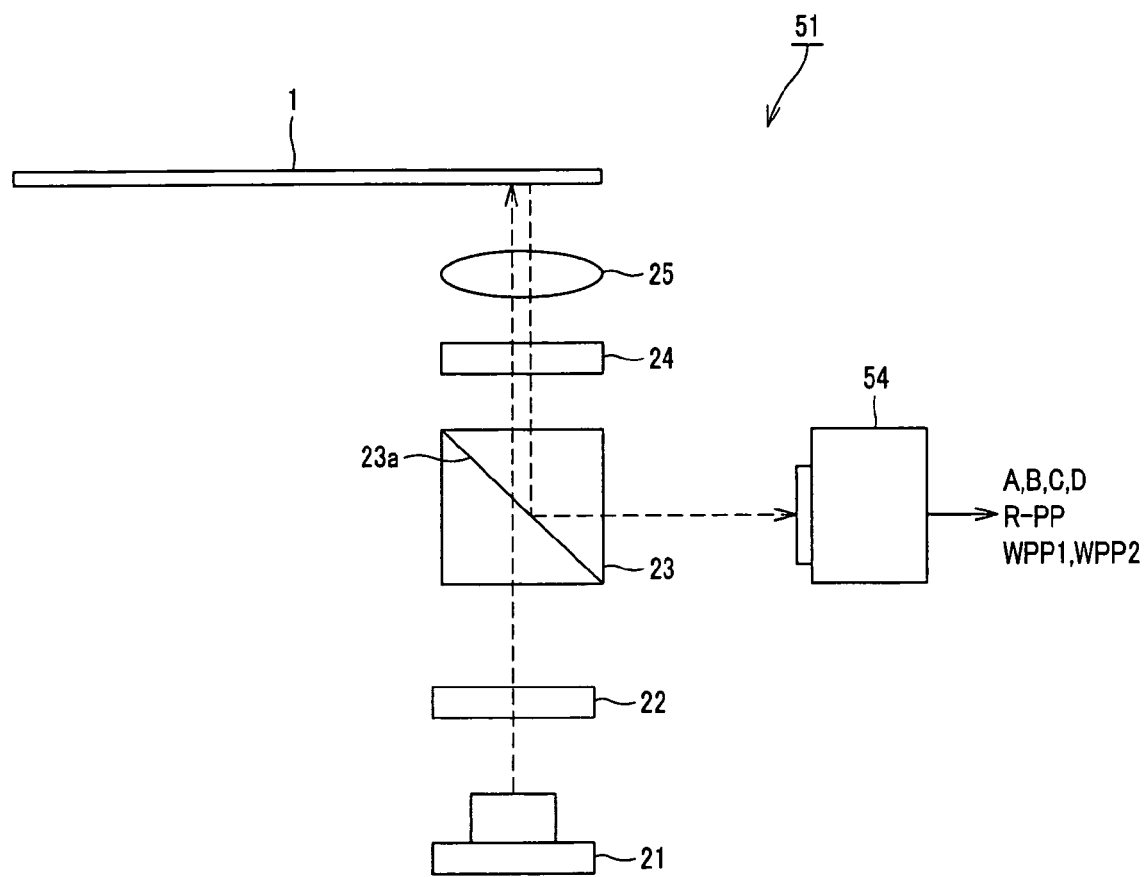
FIG. 14 shows the structure of an optical head device in the further optical disc drive.

Referring to FIG. 14, the optical head unit 51 includes a laser diode 21, a collimator lens 22, a polarization beam splitter 23, a quarter wave plate 24, an objective lens 25 and a light detecting unit 54.

The light detecting unit 54 is supplied with return light, reflected back from the optical disc 1, and converts the light into an electrical signal proportionate to the light volume. The light detecting unit 54 also generates and outputs various detection signals (A, B, C, D, R-PP, WPP1 and WPP2). With the light detecting unit 54, the functions described above are packaged in a sole semiconductor chip.

A more specified structure of the light detecting unit 54 will now be explained in further detail.

Figure 15B:
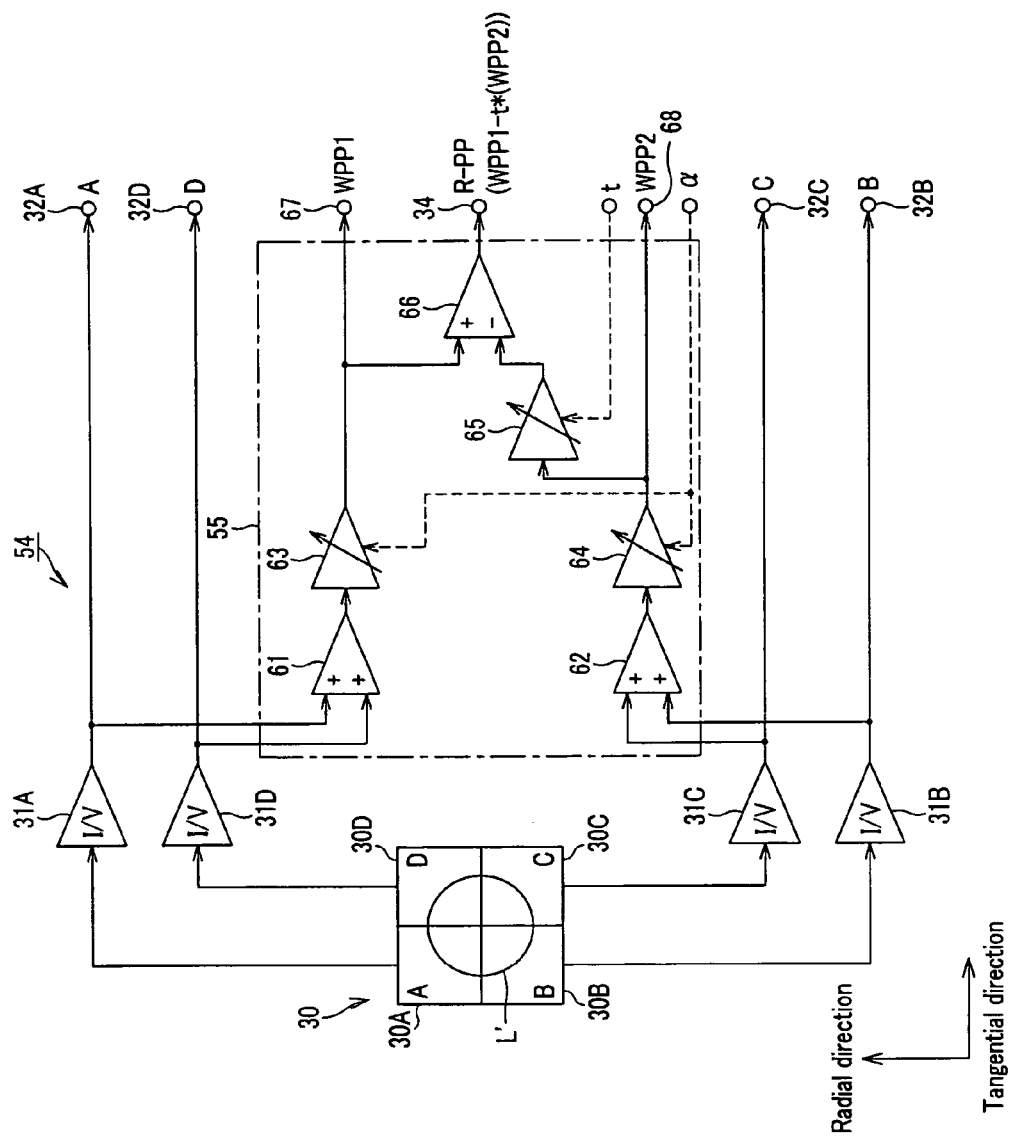
FIGS. 15A and 15B show the configuration of a light detecting unit in the optical head device in the further optical disc drive.
Figure 15A:
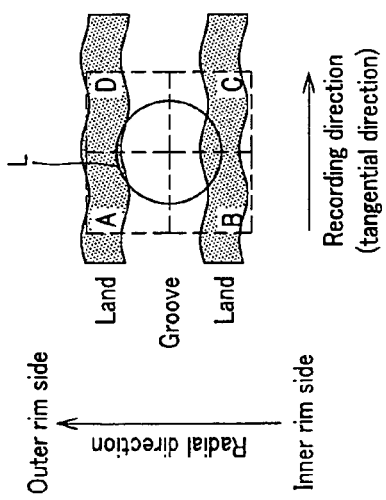

FIG. 15 illustrates the inner structure of the light detecting unit 54.

Referring to FIG. 15B, the light detecting unit 54 includes a four-segment light detecting unit 30, a first current-to-voltage converter 31A, a second current-to-voltage converter 31B, a third current-to-voltage converter 31C and a fourth current-to-voltage converter 31D.

The light detecting unit 54 also includes a push-pull signal generator 55. This push-pull signal generator 55 generates the radial push-pull signal (R-PP) and the two correction signals (WPP1, WPP2). These signals are used for calculating the wobble and LPP signals.

The first correction signal (WPP1) is a signal obtained on dividing a signal representing a total light volume (A+D) of the photodetector segments A and D lying on one side, here an outer rim side, when the photodetector segments A to D are split in two in the radial direction, by the coefficient $\alpha$ representing the recording speed of the optical disc 1 or the laser power of the laser light, that is, $((A+D)/\alpha)$. The second correction signal (WPP2) is a signal obtained on dividing a signal representing a total light volume (B+C) of the photodetector segments B and C lying on the opposite side, here an inner rim side, when the photodetector segments A to D are split in two in the radial direction, by the coefficient $\alpha$ representing the recording speed of the optical disc 1 or the laser power of the laser light, that is, $((B+C)/\alpha)$.

Specifically, the push-pull signal generator 55 includes a first adder 61, a second adder 62, a first multiplier 63, a second multiplier 64, a third multiplier 65 and a subtractor 66.

The push-pull signal generator 55 is supplied with voltage signals A to D, output from the first to fourth current-to-voltage converters 31A to 31D. The push-pull signal generator 55 is also supplied with the coefficients t and $\alpha$ from the system controller 17 provided outside of the light detecting unit 54.

The first adder 61 is supplied with the voltage signals A and D and sums these voltages to generate the signal (A+D). That is, the first adder 61 generates a signal that represents the volume of light illuminated on the outer rim side photodetector segments (30A, 30D) when the four-segment photodetector 30 is split into two parts along the radial direction.

The second adder 62 is supplied with the voltage signals B and C and sums these voltages to generate the signal (B+C). That is, the second adder 62 generates a signal that represents the volume of light illuminated on the inner rim side photodetector segments (30B, 30C) when the four-segment photodetector 30 is split into two parts along the radial direction.

The first multiplier 63 divides the signal (A+D), generated by the first adder 61, with the coefficient $\alpha$, entered from outside, to generate a signal $((A+D)/\alpha)$.

The second multiplier 64 divides the signal (B+C), generated by the second adder 62, with the coefficient $\alpha$, entered from outside, to generate a signal $((B+C)/\alpha)$.

The push-pull signal generator 55 outputs the signal, generated by the first multiplier 63, as the first correction signal (WPP1). This first correction signal (WPP1) is sent via terminal 67 to the preamplifier 52. The push-pull signal generator 55 also outputs the signal, generated by the second multiplier 64, as the second correction signal (WPP2). This second correction signal (WPP2) is sent via terminal 68 to the preamplifier 52.

The third multiplier 65 multiplies the second correction signal (WPP2), generated by the second multiplier 64, with the coefficient t, entered from outside, to generate a signal (t×(WPP2)).

The subtractor 66 subtracts the coefficient (t×(WPP1)), generated by the third multiplier 65, from the first correction signal (WPP1), generated by the first multiplier 63, to generate a signal (WPP1−t×WPP2).

The push-pull signal generator 55 outputs the signal, generated by this subtractor 66, as the radial push-pull signal (R-PP). The radial push-pull signal (WPP1−t×WPP2) is supplied via terminal 69 to the preamplifier 52.

The first correction signal (WPP1), second correction signal (WPP2) and the radial push-pull signal (R-PP), found as described above, are used for calculating the wobble signal and LPP signal.

(Method for Calculating Coefficients t and $\alpha$)

The coefficient t will now be explained.

The coefficient t is set to a value related with the ratio of the first correction signal (WPP1) and the second correction signal (WPP2) in case a spot L with an ideal light volume distribution is illuminated to the center of a recording track.

Specifically, the system controller 17 sets the coefficient t as follows:

First, the system controller 17 detects the first correction signal (WPP1) and the second correction signal (WPP2), from the pre-amplifier 52, during the initial operation, such as during loading the optical disc 1 or on power up. The system controller 17 then calculates the ratio of these two signals ((WPP2)/(WPP1)). The system controller 17 converts the so calculated ratio ((WPP2)/(WPP1)) into a value matched to the third multiplier 65 and sets the value thus found on conversion as the coefficient t. The value matched to the third multiplier 65 is a value for selecting a switch if the system is such a one as changes over a resistor to cause a change in the gain.

The system controller 17 sends the coefficient t thus found to the light detecting unit 54 in the optical head device 51 to cause the as-corrected radial push-pull signal (WPP1−t× WPP2) to be output from the light detecting unit 54.

The coefficient ☐ is of such a value representing the recording speed of the optical disc 1 or the power of the laser light radiated from the optical head device 11.

In recording on the optical disc 1, the recording speed is not necessarily the ordinary recording speed, but multiple-speed recording, such as double speed recording, quadruple speed recording or an octuple speed recording may occasionally be used. In case of such multiple-speed recording, the laser light power needs to be increased with increase in the recording speed. Consequently, the radial push-pull signal (R-PP), detected by the return light beam at the time of recording, is increased in signal level in keeping with the recording speed. However, stringent requirements on the S/N ratio are imposed on the wobble signal or the LPP signal, such that these signals cannot be set to a large dynamic range as compared to other detection signals. It is therefore desirable for the radial push-pull signal (R-PP) to be output at the same level even in case of high multiple-speed recording.

Thus, with the light detecting unit 54, the radial push-pull signal (R-PP) is corrected using the coefficient ☐ consistent with the recording speed of the optical disc 1 or the power of laser light radiated from the optical head device 11.

Specifically, the system controller 17 detects the outstanding multiple speed of the optical disc 1 or the power of laser light as set in keeping with the outstanding multiple speed. The system controller then converts the so detected value into a value related with the first multiplier 63 or the second multiplier 64 and sets the value thus found on conversion as the coefficient ☐. The value matched to the multiplier is a value for selecting a switch if the system is such a one as changes over a resistor to cause a change in the gain.

The system controller 17 sends the coefficient ☐, thus found, to the light detecting unit 54 in the optical head unit 51, and causes the light detecting unit 54 to output the first correction signal (WPP1) and the second correction signal (WPP2).

(Favorable Effect of Applying the Present Invention to an Optical Disc Drive)

With the optical disc drive 50, described above, the first correction signal (WPP1) and the second correction signal (WPP2) as well as the push-pull signal ((WPP1−t×(WPP2)) are generated in the optical head unit 51.

Hence, with the optical disc drive 50, as in the optical disc drive 10, there is no risk of ringing produced in the radial push-pull signal (R-PP) or of the slew rate worsened, so that it is now possible to detect the wobble and LPP signals accurately.

Moreover, with the optical disc drive 50, the radial push-pull signal is corrected within the light detecting unit 54, responsive to the recording speed or the laser power, even in case the volume of laser light is increased responsive to the recording speed, with the consequence that the radial push-pull signal may be output at all times at the same signal level.

Hence, the wobble and LPP signals may be detected accurately even if the recording speed becomes higher.

With the optical disc drive 50, the radial push-pull signal (R-PP) is generated based on the first correction signal (WPP1) and the second correction signal (WPP2). It is however possible to generate the radial push-pull signal by (A+D)−t×(B+C) and to carry out only the calculations of the coefficient t using the first and second correction signals (WPP1, WPP2), as in the optical disc drive 10, explained previously.

The present invention is not limited to the above embodiments, explained with reference to the drawings and, as will be apparent to those skilled in the art, various changes, substitutions or equivalents may be attempted without departing from the scope and the purport of the invention as defined in the claims.

The invention claimed is:

1. An optical disc apparatus for recording information onto an optical disc, comprising: an optical head device including a laser light emitting unit configured to radiate laser light onto said optical disc, and a light detection unit illuminated by return light of the radiated laser light and configured to generate an electrical signal containing information components obtained from said optical disc based on the return light; and a signal processing circuit configured to perform control for reproducing signals recorded on said optical disc or for recording signals onto said optical disc responsive to the electrical signal output from said optical head device; said light detection unit including: a photoelectric converter unit divided into at least two portions along a direction corresponding to the radial direction of said optical disc; a multiplication circuit configured to multiply an electrical signal, generated by one of said two portions of the photoelectric converter unit, obtained by division in a direction corresponding to the radial direction of said optical disc, with a coefficient t; and a differential circuit configured to calculate a difference between an electrical signal generated by the other of said two portions of the photoelectric converter unit obtained by division in the direction corresponding to the radial direction of said optical disc, and the electrical signal output from said multiplication circuit, to generate a radial push-pull signal, wherein said coefficient t is set to a value corresponding to a ratio of an average value of an electrical signal by return light illuminating said one of said two portions of said photoelectric converter unit and an average value of an electrical signal by return light illuminating said other of said two portions, or a ratio of said average value, sampled at a preset timing, of said electrical signal by return light illuminating said one of said two portions, and said average value, sampled at a preset timing, of said electrical signal by return light illuminating said other of said two portions, and wherein said signal processing circuit adjusts said coefficient t responsive to an error rate of a signal contained in boundary components of a recording track of said optical disc.

2. The optical disc apparatus according to claim 1 wherein said light detection unit comprises:
a first amplifier circuit configured to amplify an electrical signal generated by said one of said two portions of the photoelectric converter unit by an amplification factor related to the power of laser light illuminated on said optical disc for recording signals thereon, or to a rotational speed of said optical disc; and
a second amplifier circuit configured to amplify the electrical signal generated by said other of said two portions of the photoelectric converter unit by said amplification factor,
wherein said multiplication circuit is configured to multiply the electrical signal output by said first amplifier circuit with a coefficient t, and said differential circuit is configured to calculate a difference between the electrical signal output from said second amplifier circuit and the electrical signal output from said multiplication circuit to generate a radial push-pull signal.

3. An optical disc apparatus for recording information onto an optical disc, comprising: an optical head device including a laser light emitting unit configured to radiate laser light onto said optical disc, and a light detection unit illuminated by return light of the radiated laser light and configured to generate an electrical signal containing information components obtained from said optical disc based on the return light; and a signal processing circuit configured to perform control for reproducing signals recorded on said optical disc or for recording signals onto said optical disc responsive to the electrical signal output from said optical head device; said light detection unit including: a photoelectric converter unit divided into at least two portions along a direction corresponding to the radial direction of said optical disc; a multiplication circuit configured to multiply an electrical signal, generated by one of said two portions of the photoelectric converter unit, obtained by division in a direction corresponding to the radial direction of said optical disc, with a coefficient t; and a differential circuit configured to calculate a difference between an electrical signal generated by the other of said two portions of the photoelectric converter unit obtained by division in the direction corresponding to the radial direction of said optical disc, and the electrical signal output from said multiplication circuit, to generate a radial push-pull signal, wherein said coefficient t is set to a value corresponding to a ratio of an average value of an electrical signal by return light illuminating said one of said two portions of said photoelectric converter unit and an average value of an electrical signal by return light illuminating said other of said two portions, or a ratio of said average value, sampled at a preset timing, of said electrical signal by return light illuminating said one of said two portions, and said average value, sampled at a preset timing, of said electrical signal by return light illuminating said other of said two portions, and wherein said signal processing circuit adjusts said coefficient t responsive to an error rate of a signal contained in a wobble signal of said optical disc.

4. An optical disc apparatus for recording information onto an optical disc, comprising: an optical head device including a laser light emitting unit configured to radiate laser light onto said optical disc, and a light detection unit illuminated by return light of the radiated laser light and configured to generate an electrical signal containing information components obtained from said optical disc based on the return light; and a signal processing circuit configured to perform control for reproducing signals recorded on said optical disc or for recording signals onto said optical disc responsive to the electrical signal output from said optical head device; said light detection unit including: a photoelectric converter unit divided into at least two portions along a direction corresponding to the radial direction of said optical disc; a multiplication circuit configured to multiply an electrical signal, generated by one of said two portions of the photoelectric converter unit, obtained by division in a direction corresponding to the radial direction of said optical disc, with a coefficient t; and a differential circuit configured to calculate a difference between an electrical signal generated by the other of said two portions of the photoelectric converter unit obtained by division in the direction corresponding to the radial direction of said optical disc, and the electrical signal output from said multiplication circuit, to generate a radial push-pull signal, wherein said coefficient t is set to a value corresponding to a ratio of an average value of an electrical signal by return light illuminating said one of said two portions of said photoelectric converter unit and an average value of an electrical signal by return light illuminating said other of said two portions, or a ratio of said average value, sampled at a preset timing, of said electrical signal by return light illuminating said one of said two portions, and said average value, sampled at a preset timing, of said electrical signal by return light illuminating said other of said two portions, and wherein said signal processing circuit adjusts said coefficient t responsive to an error rate of a signal contained in a land pre-pit signal of said optical disc.

5. A light detection unit for an optical head device configured to irradiate laser light onto an optical disc for recording and/or reproducing signals for said optical disc, comprising;
a photoelectric converter unit divided into at least two portions along a direction corresponding to the radial direction of said optical disc;
a multiplication circuit configured to multiply an electrical signal, generated by one of said two portions of said photoelectric converter unit obtained by division along a direction corresponding to the radial direction of said optical disc, with a coefficient t; and
a differential circuit configured to calculate a difference between an electrical signal generated by the other of said two portions of the photoelectric converter unit obtained by division in a direction corresponding to the radial direction of said optical disc, and an electrical signal output from said multiplication circuit, to generate a radial push-pull signal,
wherein said coefficient t is set to a value corresponding to a ratio of an average value of an electrical signal by return light illuminating said one of said two portions of said photoelectric converter unit and an average value of an electrical signal by return light illuminating said other of said two portions, or a ratio of said average value, sampled at a preset timing, of said electrical signal by return light illuminating said one of said two portions, and said average value, sampled at a preset timing, of said electrical signal by return light illuminating said other of said two portions, and wherein said coefficient t is adjusted responsive to an error rate of a signal contained in boundary components of a recording track of said optical disc.

6. The light detection unit for an optical head device according to claim 5 further comprising:
a first amplifier circuit configured to amplify an electrical signal generated by said one of said two portions of the photoelectric converter unit by an amplification factor related to the power of laser light illuminated on said optical disc for recording signal thereon, or to a rotational speed of said optical disc; and
a second amplifier circuit configured to amplify the electrical signal generated by said other of said two portions of the photoelectric converter unit by said amplification factor,
wherein said multiplication circuit is configured to multiply the electrical signal output by said first amplifier circuit with said coefficient t, and
said differential circuit is configured to calculate a difference between the electrical signal output from said second amplifier circuit and the electrical signal output from said multiplication circuit to generate a radial push-pull signal.

7. An optical head device comprising:
a laser light emitting unit configured to radiate laser light onto said optical disc, and a light detection unit illuminated by return light of radiated laser light configured to generate an electrical signal containing information components obtained from said optical disc responsive to the return light;

said light detection unit including
- a photoelectric converter unit divided into at least two portions along a direction corresponding to the radial direction of said optical disc;
- a multiplication circuit configured to multiply an electrical signal generated by one of said two portions of said photoelectric converter unit, obtained by division along a direction corresponding to the radial direction of said optical disc, with a coefficient t; and
- a differential circuit configured to calculate a difference between an electrical signal generated by the other of said two portions of the photoelectric converter unit obtained by division in a direction corresponding to the radial direction of said optical disc, and an electrical signal output from said multiplication circuit, to generate a radial push-pull signal, wherein said coefficient t is set to a value corresponding to a ratio of an average value of an electrical signal by return light illuminating said one of said two portions of said photoelectric converter unit and an average value of an electrical signal by return light illuminating said other of said two portions. or a ratio of said average value, sampled at a preset timing, of said electrical signal by return light illuminating said one of said two portions, and said average value, sampled at a preset timing, of said electrical signal by return light illuminating said other of said two portions, and wherein said coefficient t is adjusted responsive to an error rate of a signal contained in boundary components of a recording track of said optical disc.

8. The optical head device according to claim 7 wherein said light detection unit comprises:
- a first amplifier circuit configured to amplify an electrical signal generated by said one of said two portions of the photoelectric converter unit by an amplification factor related to the power of laser light illuminated on said optical disc for recording signals thereon, or to a rotational speed of said optical disc; and
- a second amplifier circuit configured to amplify the electrical signal generated by said other of said two portions of the photoelectric converter unit by said amplification factor, wherein said multiplication circuit is configured to multiply the electrical signal output by said first amplifier circuit with said coefficient t, and said differential circuit is configured to calculate a difference between the electrical signal output from said second amplifier circuit and the electrical signal output from said multiplication circuit to generate a radial push-pull signal.

* * * * *